US011214098B2

(12) United States Patent
Hamanaka

(10) Patent No.: US 11,214,098 B2
(45) Date of Patent: Jan. 4, 2022

(54) PNEUMATIC TIRE

(71) Applicant: The Yokohama Rubber Co., LTD., Tokyo (JP)

(72) Inventor: Hideki Hamanaka, Hiratsuka (JP)

(73) Assignee: The Yokohama Rubber Co., LTD.

( * ) Notice: Subject to any disclaimer, the term of this patent is extended or adjusted under 35 U.S.C. 154(b) by 351 days.

(21) Appl. No.: 15/902,947

(22) Filed: Feb. 22, 2018

(65) Prior Publication Data
US 2018/0236820 A1    Aug. 23, 2018

(30) Foreign Application Priority Data

Feb. 23, 2017    (JP) .............................. JP2017-032484

(51) Int. Cl.
*B60C 11/03*    (2006.01)
*B60C 11/11*    (2006.01)
*B60C 11/12*    (2006.01)

(52) U.S. Cl.
CPC ...... *B60C 11/0316* (2013.01); *B60C 11/0309* (2013.01); *B60C 11/0332* (2013.01); *B60C 11/11* (2013.01); *B60C 11/12* (2013.01); *B60C 11/125* (2013.01); *B60C 2011/036* (2013.01); *B60C 2011/0348* (2013.01); *B60C 2011/0355* (2013.01); *B60C 2011/0362* (2013.01); (Continued)

(58) Field of Classification Search
CPC ............. B60C 11/0316; B60C 11/0306; B60C 2011/036; B60C 2011/0376; B60C 2011/0379; B60C 11/11; B60C 11/12; B60C 11/125
See application file for complete search history.

(56) References Cited

U.S. PATENT DOCUMENTS 4,784,200 A * 11/1988 Fujiwara ................. B60C 11/00
152/209.18
6,182,726 B1    2/2001 Nakamura
6,527,024 B1    3/2003 Ashmore
(Continued)

FOREIGN PATENT DOCUMENTS

CN    101687441    3/2010
CN    104395111    3/2015
(Continued)

OTHER PUBLICATIONS

Machine Translation: JP-2013189099-A; Takei Ataka; (Year: 2020).*
(Continued)

*Primary Examiner* — Kendra Ly
(74) *Attorney, Agent, or Firm* — Thorpe North & Western

(57) ABSTRACT

A pneumatic tire includes at least four circumferential main grooves extending in a tire circumferential direction and at least five land portions defined by the at least four circumferential main grooves. A center land portion includes a plurality of center lug grooves extending through the center land portion in a tire lateral direction and disposed at predetermined intervals in the tire circumferential direction, and a plurality of center blocks that are defined by the plurality of center lug grooves. The center blocks each include a narrow shallow groove that extends through the center block in the tire lateral direction and that remains open when the tire comes into contact with the ground.

18 Claims, 12 Drawing Sheets

(52) U.S. Cl.
CPC .............. *B60C 2011/0365* (2013.01); *B60C 2011/0367* (2013.01); *B60C 2011/1209* (2013.01)

(56) References Cited

U.S. PATENT DOCUMENTS

| | | | |
|---|---|---|---|
| 2009/0090445 A1* | 4/2009 | Itou | B60C 11/0306 152/209.25 |
| 2010/0096055 A1* | 4/2010 | Shibano | B60C 11/1369 152/209.25 |
| 2011/0220261 A1 | 9/2011 | Matsuzawa | |
| 2011/0259494 A1* | 10/2011 | Shibano | B60C 11/0309 152/209.22 |
| 2015/0165825 A1* | 6/2015 | Kobayashi | B60C 11/0306 152/209.21 |
| 2015/0343848 A1* | 12/2015 | Washizuka | B60C 5/00 152/209.18 |
| 2016/0059638 A1* | 3/2016 | Matsuda | B60C 11/0309 152/209.25 |
| 2016/0159158 A1 | 6/2016 | Washizuka et al. | |
| 2016/0332488 A1 | 11/2016 | Araki | |

FOREIGN PATENT DOCUMENTS

| | | | | |
|---|---|---|---|---|
| CN | 105313600 | | 2/2016 | |
| CN | 105377587 | | 3/2016 | |
| CN | 105383225 | | 3/2016 | |
| EP | 0 895 876 | | 2/1999 | |
| EP | 1 026 012 | | 8/2000 | |
| JP | 2001-191741 | | 7/2001 | |
| JP | 2004-098914 | | 4/2004 | |
| JP | 2004-224131 | | 8/2004 | |
| JP | 2006-111091 | | 4/2006 | |
| JP | 2009190677 A | * | 8/2009 | ......... B60C 11/0306 |
| JP | 2010058698 A | * | 3/2010 | |
| JP | 2010064578 A | * | 3/2010 | |
| JP | 2012-07665 8 | | 4/2012 | |
| JP | 2012-076658 | | 4/2012 | |
| JP | 2012-144097 | | 8/2012 | |
| JP | 2012-171591 | | 9/2012 | |
| JP | 2013-189099 | | 9/2013 | |
| JP | 2013189099 A | * | 9/2013 | |
| JP | 2014-125109 | | 7/2014 | |
| JP | 2015-116845 | | 6/2015 | |
| JP | 2015110394 A | * | 6/2015 | ......... B60C 11/0332 |
| JP | 2015-134571 | | 7/2015 | |
| JP | 2016-043894 | | 4/2016 | |
| KR | 10-2005-0112436 | | 11/2005 | |
| KR | 10-2015-0008551 | | 1/2015 | |
| WO | WO 2008/152914 | | 12/2008 | |
| WO | WO 2010/055659 | | 5/2010 | |
| WO | WO 2014/030503 | | 2/2014 | |
| WO | WO 2015/016051 | | 2/2015 | |
| WO | WO 2015/107599 | | 7/2015 | |

OTHER PUBLICATIONS

Machine Translation: JP-2010064578-A; Nakano, Tomoya; (Year: 2020).*
Machine Translation:JP-2009190677-A;Shibano, Keizo; (Year: 2020).*
Machine Translation: JP-2015110394-A; Numata Kazuoki; (Year: 2020).*
Machine Translation:JP-2010058698-A;Shimizu, Akiyoshi; (Year: 2020).*
Notice of Reasons for Refusal for Japanese Patent Application 2017-032484 dated Jan. 12, 2021, 9 pages, Japan.

* cited by examiner

| | Conventional Example | Comparative Example 1 | Comparative Example 2 | Comparative Example 3 | Example 1 | Example 2 | Example 3 | Example 4 | Example 5 |
|---|---|---|---|---|---|---|---|---|---|
| Number of narrow and shallow grooves | 0 (Plain) | 1 (Sipes) | 1 (Sipes) | 2 | 1 | 1 | 1 | 1 | 1 |
| Structure of narrow and shallow groove | - | Extends through | Closed | Extends through | Extends through | Extends through | Extends through | Extends through | Extends through |
| Shape of narrow and shallow groove | - | Bent | Straight | Straight | Straight | Straight | Straight | Straight | Straight |
| Hs1/Hm, Hs2/Hm | - | 0.35 | 0.04 | 0.04 | 0.04 | 0.04 | 0.04 | 0.04 | 0.04 |
| Ws1, Ws2 (mm) | - | 0.7 | 0.7 | 2.0 | 2.5 | 2.5 | 2.5 | 2.5 | 2.5 |
| Ls1/Lb1 | - | 0.13 | 0.31 | 0.35 | 0.50 | 0.55 | 0.60 | 0.65 | 0.70 |
| Ls2/Lb2 | - | 0.13 | 0.28 | 0.40 | 0.45 | 0.50 | 0.55 | 0.60 | 0.65 |
| Ls2/Ls1 | - | 1.00 | 0.79 | 0.90 | 0.60 | 0.65 | 0.70 | 0.75 | 0.80 |
| Closure of center block | No | No | No | No | No | No | No | No | No |
| Wg11 (mm) | 8.0 | 8.0 | 8.0 | 8.0 | 8.0 | 8.0 | 8.0 | 8.0 | 8.0 |
| Wg12 (mm) | 8.0 | 8.0 | 8.0 | 8.0 | 8.0 | 8.0 | 8.0 | 8.0 | 8.0 |
| Wg2 (mm) | 8.0 | 8.0 | 8.0 | 8.0 | 8.0 | 8.0 | 8.0 | 8.0 | 8.0 |
| Groove bottom sipe? | No | - | No | No | No | No | No | No | No |
| Heel and toe wear resistance | 100 | 105 | 110 | 108 | 120 | 119 | 117 | 116 | 114 |
| Wet performance | 100 | 110 | 105 | 108 | 114 | 116 | 117 | 119 | 120 |

FIG. 11A

| | Example 6 | Example 7 | Example 8 | Example 9 | Example 10 | Example 11 | Example 12 | Example 13 | Example 14 | Example 15 |
|---|---|---|---|---|---|---|---|---|---|---|
| Number of narrow and shallow grooves | 1 | 1 | 1 | 1 | 1 | 1 | 1 | 1 | 1 | 1 |
| Structure of narrow and shallow groove | Extends through | Extends through | Extends through | Extends through | Extends through | Extends through | Extends through | Extends through | Extends through | Extends through |
| Shape of narrow and shallow groove | Bent | Bent | Bent | Bent | Bent | Bent | Bent | Bent | Bent | Bent |
| Hs1/Hm, Hs2/Hm | 0.04 | 0.05 | 0.10 | 0.15 | 0.15 | 0.15 | 0.15 | 0.15 | 0.15 | 0.15 |
| Ws1, Ws2 (mm) | 2.5 | 2.5 | 2.5 | 2.5 | 2.0 | 1.0 | 2.0 | 2.0 | 2.0 | 2.0 |
| Ls1/Lb1 | 0.60 | 0.60 | 0.60 | 0.60 | 0.60 | 0.60 | 0.60 | 0.60 | 0.60 | 0.60 |
| Ls2/Lb2 | 0.55 | 0.55 | 0.55 | 0.55 | 0.55 | 0.55 | 0.55 | 0.55 | 0.55 | 0.55 |
| Ls2/Ls1 | 0.70 | 0.70 | 0.70 | 0.70 | 0.70 | 0.70 | 0.70 | 0.70 | 0.70 | 0.70 |
| Closure of center block | No | No | No | No | No | No | Yes | Yes | Yes | Yes |
| Wg11 (mm) | 8.0 | 8.0 | 8.0 | 8.0 | 8.0 | 8.0 | 1.5 | 3.0 | 4.5 | 3.0 |
| Wg12 (mm) | 8.0 | 8.0 | 8.0 | 8.0 | 8.0 | 8.0 | 8.0 | 8.0 | 8.0 | 8.0 |
| Wg2 (mm) | 8.0 | 8.0 | 8.0 | 8.0 | 8.0 | 8.0 | 8.0 | 8.0 | 8.0 | 8.0 |
| Groove bottom sipe? | No | No | No | No | No | No | No | No | No | Yes |
| Heel and toe wear resistance | 117 | 126 | 124 | 122 | 123 | 121 | 127 | 125 | 123 | 130 |
| Wet performance | 119 | 117 | 119 | 121 | 120 | 119 | 119 | 120 | 121 | 130 |

FIG. 11B

PNEUMATIC TIRE

PRIORITY CLAIM

Priority is claimed to Japan Patent Application Serial No. 2017-032484 filed on Feb. 23, 2017.

TECHNICAL FIELD

The technology relates to a pneumatic tire and particularly to a pneumatic tire that can provide good heel and toe wear resistance and wet performance in a compatible manner.

BACKGROUND ART

Heavy duty radial tires for trucks, buses, and the like employ various block patterns to increase braking performance on a snowy road surface.

In particular, however, block patterns with deep circumferential main grooves tend to decrease the rigidity of blocks, making the blocks susceptible to heel and toe wear.

In the related art of pneumatic tires designed to solve the problem, the technology described in International Patent Application Publication No. WO 2010/055659 is known.

However, there is a demand for pneumatic tires with improved wet performance.

SUMMARY

The technology provides a pneumatic tire that can provide good heel and toe wear resistance and wet performance in a compatible manner.

A pneumatic tire according to an embodiment of the technology includes:

four or more circumferential main grooves extending in a tire circumferential direction; and five or more land portions defined by the circumferential main grooves;

the land portion located on a tire equatorial plane or the land portion defined by the circumferential main groove located on the tire equatorial plane being defined as a center land portion;

the center land portion including a plurality of center lug grooves disposed at predetermined intervals in the tire circumferential direction and extending through the center land portion in a tire lateral direction, and a plurality of center blocks defined by the plurality of center lug grooves; and the plurality of center blocks each including a narrow shallow groove extending through the center block in the tire lateral direction and configured to remain open when the tire comes into contact with a ground.

In a configuration according to an embodiment of the technology, the ground contact pressure exerted on the center blocks when the tire comes into contact with the ground is dispersed via the narrow shallow grooves. Thus, heel and toe wear of the blocks is suppressed in initial stages of running of the tire.

Also, when the tire comes into contact with the ground, the narrow shallow grooves remain open without closing. Thus, the narrow shallow grooves display an edge effect, improving the wet performance of the tire.

These advantageous effects provide the tire with good heel and toe wear resistance performance and wet performance in a compatible manner.

BRIEF DESCRIPTION OF DRAWINGS

FIGS. 11A-11B include a table showing the results of performance tests of pneumatic tires according to embodiments of the technology.

DETAILED DESCRIPTION

Embodiments of the technology will be described in detail below with reference to the drawings.

However, the technology is not limited to these embodiments.

Moreover, constituents of the embodiments include elements that are substitutable while maintaining consistency with the technology, and obviously substitutable elements.

Furthermore, a plurality of modified examples described in the embodiments can be combined as desired without departing from the scope of the technology that is apparent to those skilled in the art.

Pneumatic Tire

Figure 1:
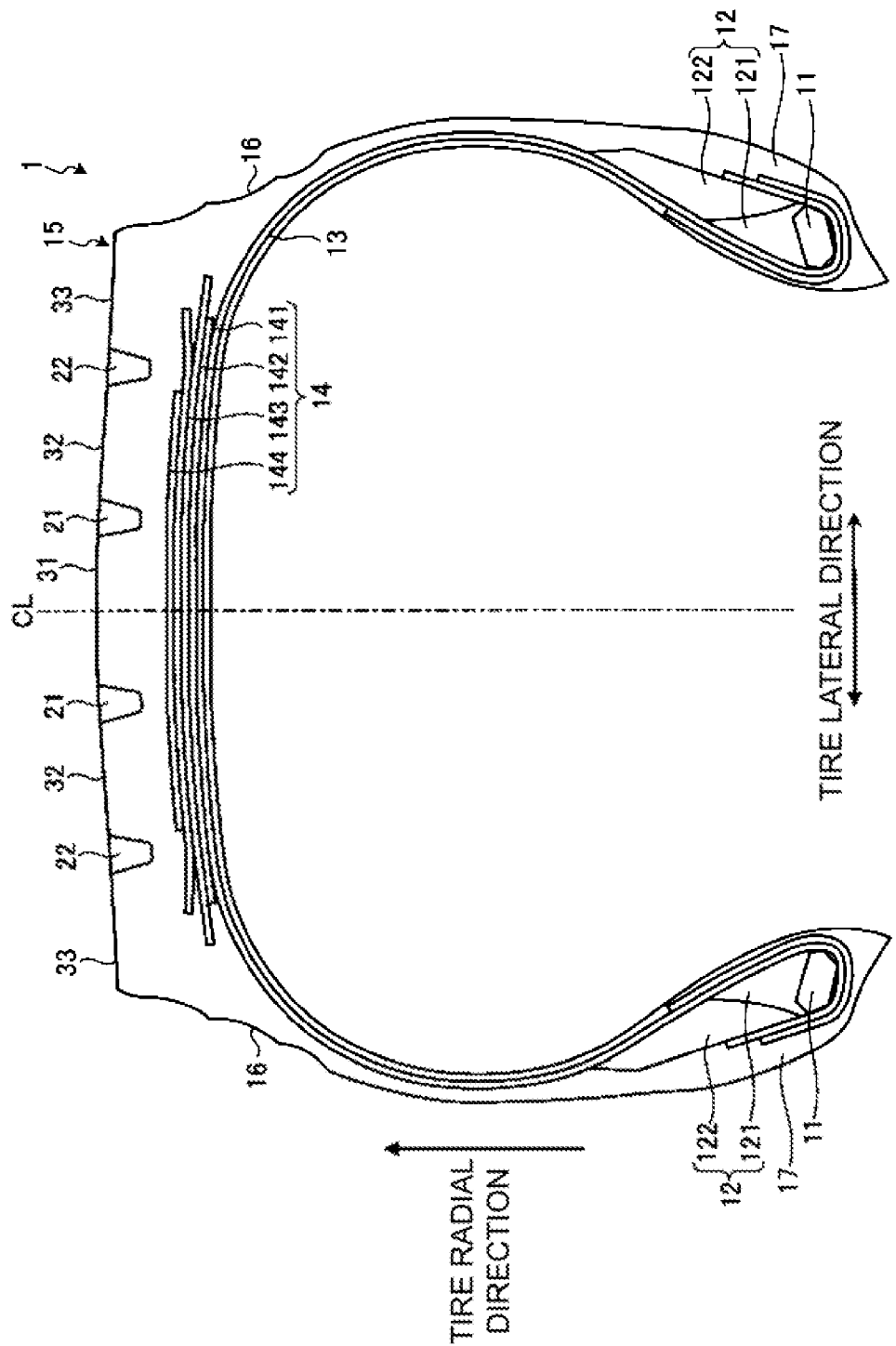
FIG. 1 is a cross-sectional view, taken along a tire meridian direction, of a pneumatic tire according to an embodiment of the technology.

FIG. 1 is a cross-sectional view, taken along a tire meridian direction, of a pneumatic tire according to an embodiment of the technology.

The same drawing illustrates a cross-sectional view of a half region of the cross-sectional view in a tire radial direction.

The same drawing illustrates a heavy duty radial tire that is mounted on trucks, buses, and the like for long-distance transport as an example of a pneumatic tire.

In FIG. 1, a "cross section taken along a tire meridian direction" refers to a cross section of the tire taken along a plane that includes a tire rotation axis (not illustrated).

Reference sign CL denotes a tire equatorial plane and refers to a plane that passes through a central point of the tire in relation to the tire rotation axis and that is normal to the tire rotation axis.

The "tire lateral direction" refers to the direction parallel with the tire rotation axis. The "tire radial direction" refers to the direction perpendicular to the tire rotation axis.

The pneumatic tire 1 has an annular structure with the tire rotation axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 each have an annular structure made by winding a bead wire made of steel or an organic fiber material in the tire circumferential direction multiple times. The pair of bead cores 11, 11 constitute cores of left and right bead portions.

The pair of bead fillers 12, 12 are each made up of a lower filler 121 and an upper filler 122. The pair of bead fillers 12, 12 are disposed outward of the pair of bead cores 11, 11 in the tire radial direction and constitute the bead portions.

The carcass layer 13 extends between the left and right bead cores 11, 11 in a toroidal shape, forming a framework of the tire.

Additionally, both end portions of the carcass layer 13 are turned back from inside to outside in the tire lateral direction and are fixed so as to wrap the bead cores 11 and the bead fillers 12.

Also, the carcass layer 13 is made by covering a plurality of carcass cords made of steel or an organic fiber material (e.g. nylon, polyester, rayon, or the like) with a coating rubber and rolling the resulting rubber coated material. The carcass layer 13 has a carcass angle (defined as a longitudinal inclination angle of the carcass cords with respect to the tire circumferential direction) ranging from 85 degrees to 95 degrees in absolute value.

The belt layer 14 is made by laminating a large-angle belt 141, a pair of cross belts 142, 143, and a belt cover 144 and is wound around an outer circumference of the carcass layer 13.

The large-angle belt 141 is made by covering a plurality of belt cords made of steel or an organic fiber material with a coating rubber and rolling the resulting rubber coated material. The large-angle belt 141 has a belt angle (defined as a longitudinal inclination angle of the belt cords with respect to the tire circumferential direction) ranging from 45 degrees to 70 degrees in absolute value.

The pair of cross belts 142, 143 are made by covering a plurality of belt cords made of steel or an organic fiber material with a coating rubber and rolling the resulting rubber coated material. The pair of cross belts 141, 142 have a belt angle ranging from 10 degrees to 55 degrees in absolute value.

Additionally, the belt angles of the pair of cross belts 142, 143 have different or opposite signs so that the cross belts 142, 143 are laminated on each other while intersecting each other in a longitudinal direction of the belt cords (i.e., the cross belts 142, 143 have a so-called cross-ply structure).

The belt cover 144 is made by covering a plurality of belt cords made of steel or an organic fiber material with a coating rubber and rolling the resulting rubber coated material. The belt cover 144 has a belt angle ranging from 10 degrees to 55 degrees in absolute value.

Tread Pattern

Figure 2:
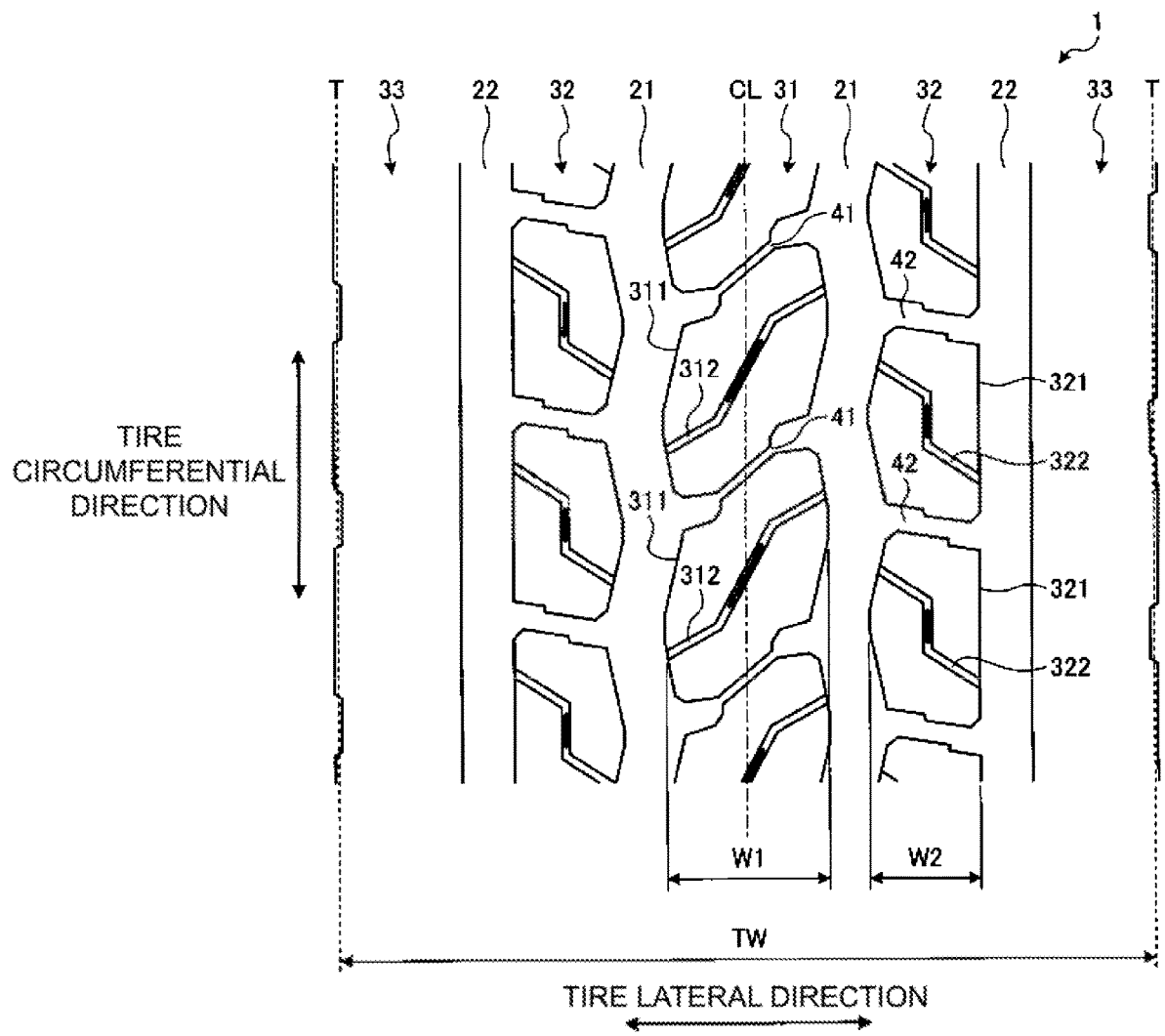
FIG. 2 is a plan view illustrating a tread surface of the pneumatic tire illustrated in FIG. 1.

FIG. 2 is a plan view illustrating a tread surface of the pneumatic tire illustrated in FIG. 1.

In FIG. 2, a "tire circumferential direction" refers to a direction defined about the tire rotation axis.

Reference sign T denotes a tire ground contact edge. Dimension reference sign TW denotes a tire ground contact width.

As illustrated in FIG. 2, the pneumatic tire 1 includes on a tread surface a plurality of circumferential main grooves 21, 22 extending in the tire circumferential direction, a plurality of land portions 31, 32 defined by the plurality of circumferential main grooves 21, 22, and a plurality of lug grooves 41, 42 disposed in the land portions 31, 32.

The "main groove" is a groove for which a manufacturer is required to display a wear indicator stipulated by JATMA and has a groove width of at least 6.0 mm and a groove depth of at least 10 mm.

A "lug groove," which will be described below, is a lateral groove extending in the tire lateral direction and having a groove width of at least 1.0 mm and a groove depth of at least 3.0 mm. The lug groove functions as a groove that opens when the tire comes into contact with the ground.

The groove width is measured as a maximum value of a distance between left and right groove walls of a groove opening portion with the tire mounted on a specified rim, inflated to a specified internal pressure, and in an unloaded state.

In a configuration in which a land portion includes a notch or chamfered portion at each of its edge portions, a groove width of a groove defined by such land portions is measured based on points where a tread surface intersects extensions of groove walls, when the groove is viewed in a cross section in which a longitudinal direction of the groove constitutes a normal.

Additionally, in a configuration in which a groove extends in a zig-zag or wavy fashion in the tire circumferential direction, a groove width is measured based on center lines of amplitudes of groove walls.

The groove depth is measured as a maximum value of a distance from a tread surface to a bottom of a groove with the tire mounted on a specified rim, inflated to a specified internal pressure, and in an unloaded state.

Additionally, in a configuration in which a groove includes partially an uneven portion or a sipe on a bottom thereof, a groove depth is measured excluding these portions.

The "specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO).

The "specified internal pressure" refers to a "maximum air pressure" defined by JATMA, to a maximum value of "TIRE LOAD LIMITS AT VARIOUS COLD INFLATION PRESSURES" defined by TRA, or "INFLATION PRESSURES" defined by ETRTO.

The "specified load" refers to a "maximum load capacity" defined by JATMA, a maximum value of "TIRE LOAD LIMITS AT VARIOUS COLD INFLATION PRESSURES" defined by TRA, or a "LOAD CAPACITY" defined by ETRTO.

However, according to JATMA, for passenger vehicle tires, the specified internal pressure is an air pressure of 180 kPa, and the specified load is 88% of a maximum load capacity.

For example, in the configuration of FIG. 2, the pneumatic tire 1 has a substantially point symmetrical tread pattern with respect to a point on a tire equatorial plane CL.

However, the technology is not limited thereto, and, for example, the pneumatic tire 1 may have a tread pattern that is laterally axially symmetrical with respect to the tire equatorial plane CL, or a tread pattern that is laterally asymmetrical or a tread pattern having directionality in a rotating direction of the tire (not illustrated).

In the tread pattern of FIG. 2, left and right regions defined by the tire equatorial plane CL as a boundary each have two circumferential main grooves 21, 22.

The two circumferential main grooves 21, 22 on the left region are disposed symmetrical with the two corresponding circumferential main grooves 21, 22 on the right region with respect to the tire equatorial plane CL.

Five land portions 31 to 33 are defined by these circumferential main grooves 21, 22.

In the land portions, the land portion 31 is disposed on the tire equatorial plane CL.

However, the technology is not limited thereto, and three or at least five circumferential main grooves may be disposed, or the circumferential main grooves may be disposed laterally asymmetrical with respect to the tire equatorial plane CL (not illustrated).

Additionally, although the land portion is disposed on the tire equatorial plane CL, the land portion may be disposed offset from the tire equatorial plane CL by disposing one of the circumferential main grooves on the tire equatorial plane CL (not illustrated).

Of the at least two circumferential main grooves (including the circumferential main groove disposed on the tire equatorial plane CL) that are disposed on either of the tire tread regions defined by the tire equatorial plane CL as a boundary, the circumferential main groove located outermost in the tire lateral direction is defined as an outermost circumferential main groove.

The outermost circumferential main groove is defined in each of the left and right regions that are bounded by the tire equatorial plane CL.

The tire ground contact width, or tread width, TW is measured as a maximum straight-line distance in a tire axial direction of a tire contact surface defined between the tire and a flat plate with the tire mounted on a specified rim, inflated to a specified internal pressure, placed perpendicular to the flat plate in a static state, and loaded with a load corresponding to a specified load.

The tire ground contact edge T is defined as a maximum width position in the tire axial direction of the tire contact surface between the tire and the flat plate with the tire mounted on the specified rim, inflated to the specified internal pressure, placed perpendicular on the flat plate in the static state, and loaded with a load corresponding to the specified load.

A region bounded by the left and right outermost circumferential main grooves 22, 22 and located on the tire equatorial plane CL side is called a center region, and left and right regions bounded by the left and right outermost circumferential main grooves 22, 22 and located on the tire ground contact edge T sides are called shoulder regions.

The land portion 31 located on the tire equatorial plane CL (see FIG. 2) or the land portions defined by the circumferential main groove located on the tire equatorial plane CL (not illustrated) are defined as center land portions.

In the latter case, two center land portions are defined.

The land portions 32 outwardly adjacent to the center land portion 31 in the tire lateral direction are defined as second land portions.

Moreover, the land portions 33 defined by the outermost circumferential main grooves 22 and located outward thereof in the tire lateral direction are defined as shoulder land portions.

The shoulder land portions 33 are outermost land portions in the tire lateral direction and are located on the tire ground contact edges T.

For example, in the configuration of FIG. 2, the four circumferential main grooves 21, 22, that is, the two left circumferential main groves 21, 22 and the two right circumferential main grooves 21, 22 are disposed laterally symmetrical with each other with respect to the tire equatorial plane CL.

Additionally, the one center land portion 31, the pair of left and right second land portions 32, 32, and the pair of left and right shoulder land portions 33, 33 are defined by these circumferential main grooves 21, 22.

The left and right circumferential main grooves 21, 21 that define the center land portion 31 have a zig-zag shape that oscillates in the tire lateral direction, and the left and right outermost circumferential main grooves 22, 22 have a straight shape.

The center land portion 31 and the left and right second land portions 32, 32 each include the plurality of lug grooves 41, 42 that extend through the corresponding land portions in the tire lateral direction, and a plurality of blocks 311, 321 defined by the plurality of lug grooves 41, 42.

The left and right shoulder land portions 33, 33 form ribs that extend continuously in the tire circumferential direction.

Block Row of Center Land Portion

Heavy duty radial tires for use on trucks, buses, and the like employ block patterns to increase braking performance on a snowy road surface.

In particular, however, block patterns with deep circumferential main grooves tent to decrease the rigidity of blocks, making the blocks susceptible to heel and toe wear.

However, there is also a demand for pneumatic tires with improved wet performance.

In light of the above, the pneumatic tire 1 employs the following configuration to provide good heel and toe wear resistance and wet performance in a compatible manner.

Figure 3:
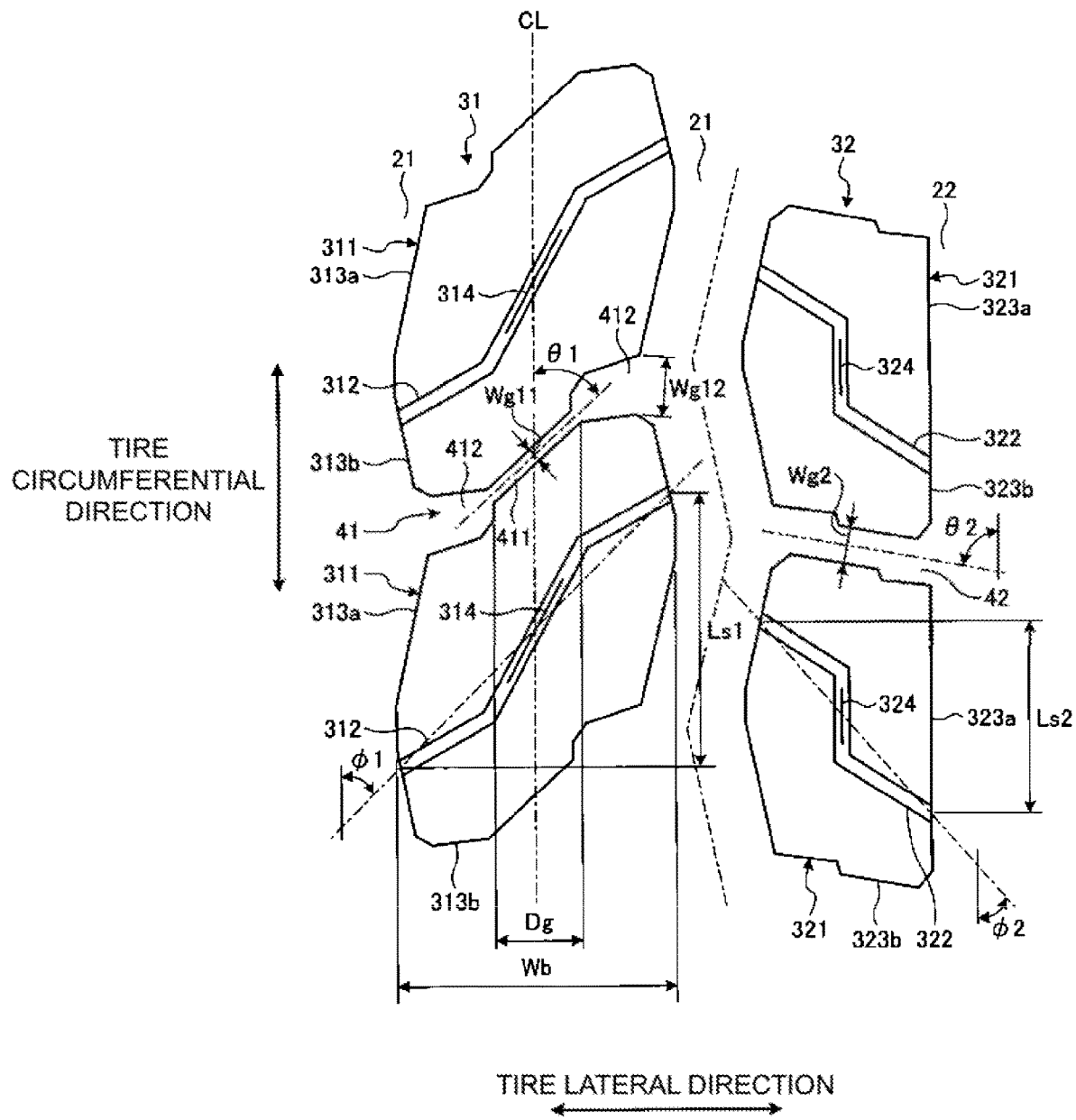
FIG. 3 is an explanatory diagram illustrating a block row of a center region of the tread surface illustrated in FIG. 2.

FIG. 3 is an explanatory diagram illustrating block rows of the center region of the tread surface illustrated in FIG. 2.

Figure 4:
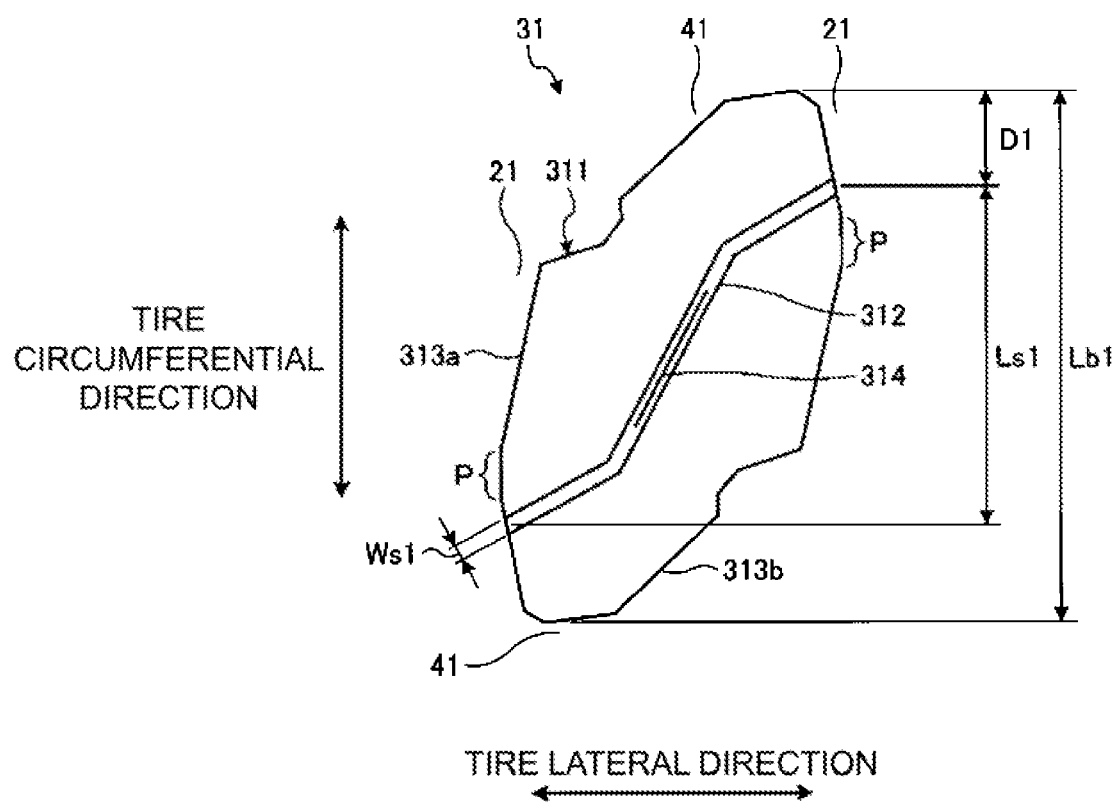
FIG. 4 is a plan view illustrating the center block illustrated in FIG. 2.
Figure 5:
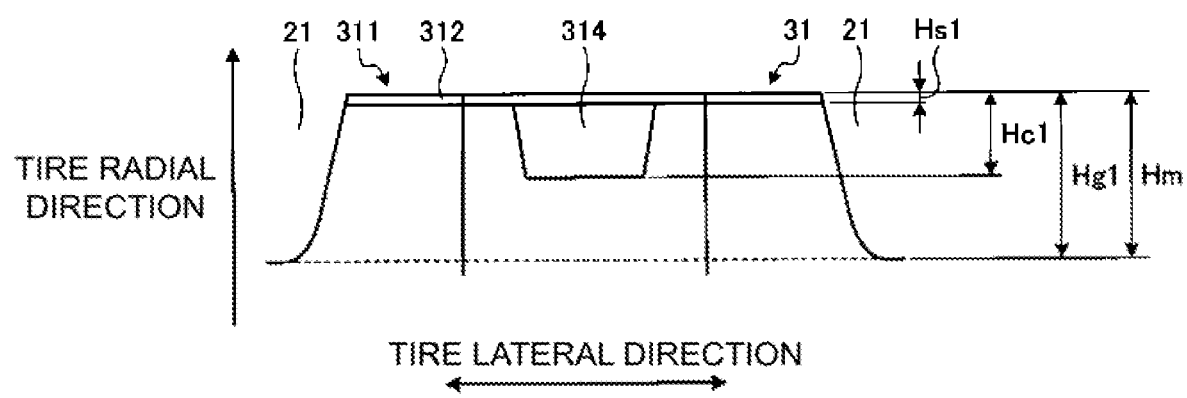
FIG. 5 is a cross-sectional view illustrating the center block illustrated in FIG. 2.

FIGS. 4 and 5 are a plan view (FIG. 4) and a cross-sectional view (FIG. 5), respectively, illustrating a center block illustrated in FIG. 2.

In the drawings, FIG. 3 focuses on and illustrates a pair of center blocks 311, 311 lying adjacent to each other in the tire circumferential direction and a pair of second blocks 321, 321 lying adjacent to each other in the tire circumferential direction.

FIG. 4 focuses on and illustrates a single center block 311.

FIG. 5 illustrates a cross-sectional view of the center block 311 taken along a longitudinal direction of a narrow shallow groove 312.

As illustrated in FIG. 2, the center land portion 31 includes the plurality of center lug grooves 41, and the plurality of center blocks 311.

The center lug grooves 41 extend through the center land portion 31 in the tire lateral direction and open to the left and right circumferential main grooves 21, 21 that define the center land portion 31.

Additionally, the plurality of center lug grooves 41 are disposed at predetermined intervals in the tire circumferential direction.

The center block 311 is defined by the pair of the circumferential main grooves 21, 21 that lie adjacent to each other in the tire lateral direction, and the pair of the center lug grooves 41, 41 that lie adjacent to each other in the tire circumferential direction.

Additionally, the plurality of center blocks 311 are arranged in a row in the tire circumferential direction.

For example, in the configuration illustrated in FIG. 2, as illustrated in FIG. 3, the left and right circumferential main grooves 21, 21 that define the center land portion 31 have the zig-zag shape that oscillates in the tire lateral direction. As a result, left and right edge portions of the center block 311 project in the tire lateral direction.

Additionally, the center block 311 has a point symmetrical shape as a whole.

As illustrated in FIG. 3, a central portion (a first lug groove portion 411 which will be described below) of the center lug groove 41 is inclined at a predetermined inclination angle θ1 with respect to the tire circumferential direction. Then, the adjacent center lug grooves 41 are inclined in the same direction.

Accordingly, the center block 311 is defined by the pair of inclined center lug grooves 41, 41, and the longitudinal direction of the center block 311 is inclined with respect to the tire circumferential direction.

As illustrated in FIG. 4, the left and right edge portions of the center block 311 that face the corresponding circumferential main grooves 21 each have a maximum projection position P in the tire lateral direction.

Additionally, the maximum projection positions P have a predetermined circumferential length. As a result, the left and right edge portions of the center block 311 are parallel to the tire circumferential direction in the maximum projection positions P.

Additionally, the maximum projection positions P are lopsided in the tire circumferential direction. As a result, the edge portions of the center block 311 are divided circumferentially into a long portion and a short portion in the maximum projection positions P.

In FIG. 2, a width W1 of the center land portion 31 and a width W2 of the second land portion 32 preferably have a relationship of $1.1 \leq W1/W2 \leq 1.7$, and more preferably have a relationship of $1.3 \leq W1/W2 \leq 1.6$.

In addition, the width W1 of the center land portion 31 and the tread width TW preferably have a relationship of $0.15 \leq W1/TW \leq 0.25$.

A relatively large ground contact pressure acts on the center land portion 31 when the tire comes into contact with the ground, making the center land portion 31 susceptible to heel and toe wear.

Accordingly, the width W1 of the center land portion 31 is set at a large value to reinforce the rigidity of the center land portion 31.

This reduces the amount of deformation of the blocks when the tire comes into contact with the ground to thereby effectively suppress heel and toe wear.

As illustrated in FIG. 4, one center block 311 is provided with one narrow shallow groove 312.

The narrow shallow groove 312 has an open structure that extends through the center block 311 in the tire lateral direction and opens to the left and right circumferential main grooves 21, 21 that define the center land portion 31.

The narrow shallow groove 312 has a narrow groove width and a shallow groove depth. As a result, the narrow shallow groove 312 remains open without closing when the tire comes into contact with the ground.

Thus, the narrow shallow groove 312 is distinct from sipes that close when the tire comes into contact with the ground.

Specifically, a groove width Ws1 (see FIG. 4) of the narrow shallow groove 312 is preferably in the range of $1.0 \text{ mm} \leq Ws1 \leq 4.0 \text{ mm}$, and more preferably in the range of $1.5 \text{ mm} \leq Ws1 \leq 3.0 \text{ mm}$.

The groove width Ws1 of the narrow shallow groove 312 is set in association with a maximum groove depth Hm of the circumferential main groove 21 and a maximum groove depth Hg1 of the center lug groove 41 (see FIG. 5) so that the narrow shallow groove 312 does not close when the tire comes into contact with the ground.

Specifically, the maximum groove depth Hm of the circumferential main groove 21 and a maximum groove depth Hs1 of the narrow shallow groove 312 preferably have a relationship of $0.05 \leq Hs1/Hm \leq 0.15$, and more preferably a relationship of $0.07 \leq Hs1/Hm \leq 0.12$.

Additionally, it is preferable that the circumferential main groove 21 is a so-called deep groove with its maximum groove depth Hm in a range of $20 \text{ mm} \leq Hm$.

Similarly, the maximum groove depth Hg1 of the center lug groove 41 and the maximum groove depth Hs1 of the narrow shallow groove 312 preferably have a relationship of $0.05 \leq Hs1/Hg1 \leq 0.20$, and more preferably a relationship of $0.08 \leq Hs1/Hg1 \leq 0.14$.

Additionally, the maximum groove depth Hg1 of the center lug groove 41 is preferably in the range of $16 \text{ mm} \leq Hg1$.

The groove width of the narrow shallow groove 312 is measured as a maximum distance between left and right groove walls of a groove opening portion of the narrow shallow groove 312 with the tire mounted on a specified rim, inflated to a specified internal pressure, and in an unloaded state.

For example, in a configuration in which the narrow shallow groove 312 has a notch or chamfered portion (not illustrated) at either side of the groove opening portion, the groove width is measured based on points where the tread surface intersects extensions of the groove walls when the groove is viewed in a cross-section in which a longitudinal direction of the groove constitutes the normal.

In the configuration described above, when the tire comes into contact with the ground, the ground contact pressure on the center block 311 is dispersed via the narrow shallow groove 312. As a result, heel and toe wear of the blocks is suppressed in initial stages of running of the tire.

Also, when the tire comes into contact with the ground, the narrow shallow groove 312 remains open without closing. As a result, the narrow shallow groove 312 exhibits an edge effect, improving the wet performance of the tire.

In this way, good heel and toe wear resistance performance and wet performance of the tire are provided in a compatible manner.

As illustrated in FIG. 4, a circumferential length Ls1 of the narrow shallow groove 312 and a circumferential length Lb1 of the center block 311 preferably have a relationship of $0.50 \leq Ls1/Lb1 \leq 0.70$, and preferably have a relationship of $0.55 \leq Ls1/Lb1 \leq 0.65$.

This configuration ensures appropriately the extension range of the narrow shallow groove 312 in the tire circumferential direction, which ensures appropriately in turn the improvement in heel and toe wear resistance performance and wet performance by the narrow shallow grooves 312.

The circumferential length Ls1 of the narrow shallow groove 312 is measured using the opening positions of the narrow shallow groove 312 at the edge portions of the center block 311 as measuring points.

The circumferential length Lb1 of the center block 311 is measured as a maximum value of an extension length of the center block 311 in the tire circumferential direction.

Additionally, in FIG. 4, a circumferential distance D1 from a circumferential end portion of the center block 311 to an end portion of the narrow shallow groove 312 and the circumferential length Lb1 of the center block 311 preferably have a relationship of $0.15 \leq D1/Lb1 \leq 0.25$, and preferably have a relationship of $0.17 \leq D1/Lb1 \leq 0.22$.

This makes appropriate the position where the narrow shallow groove 312 is disposed in the block.

For example, in the configuration of FIG. 3, each of the center blocks 311 includes a single narrow shallow groove 312, and a pair of small blocks 313a, 313b defined by the narrow shallow groove 312.

The small blocks 313a, 313b include a plain tread surface having neither a sipe nor other thin grooves.

This ensures an appropriate ground contact area of the blocks.

Note that the technology is not limited thereto, and the center block 311 may include an additional sipe.

As illustrated in FIG. 3, the narrow shallow groove 312 has a bent shape with a plurality of bend points.

Additionally, the narrow shallow groove 312 is overall inclined at a predetermined angle φ1 with respect to the tire circumferential direction and is inclined in the same direction as that in which the center lug grooves 41 are inclined.

The inclination angle φ1 of the narrow shallow groove 312 is in the range of 25 degrees≤φ≤65 degrees.

This makes the inclination angle φ1 of the narrow shallow groove 312 appropriate, ensuring appropriately the improvement in heel and toe wear resistance performance and wet performance by the narrow shallow grooves 312.

The inclination angle φ1 of the whole of the narrow shallow groove 312 is measured as an angle formed by an imaginary line joining the left and right opening portions of the narrow shallow groove 312 at the edge portions of the center block 311 and the tire circumferential direction.

As illustrated in FIG. 4, the center block 311 overall has a point symmetrical structure, and the left and right edge portions of the center block 311 are divided into a long portion and a short portion by the maximum projection positions P in the tire lateral direction as boundaries.

Then, the narrow shallow groove 312 opens to the short portions of the left and right edge portions of the center block 311.

Accordingly, the opening portions of the narrow shallow groove 312 are disposed offset from the maximum projection positions P of the edge portions of the center block 311.

This makes the position of the opening portions of the narrow shallow groove 312 appropriate.

As illustrated in FIG. 5, the narrow shallow groove 312 has a certain groove depth Hs1.

As described above, the groove depth Hs1 of the narrow shallow groove 312 is set extremely shallow relative to the groove depth Hm of the circumferential main groove 21 and the groove depth Hg1 of the center lug groove 41 so that the narrow shallow groove 312 does not close when the tire comes into contact with the ground.

As illustrated in FIGS. 3 to 5, the center block 311 includes a groove bottom sipe 314 at a central portion of a bottom of the narrow shallow groove 312.

In FIG. 5, a maximum depth Hc1 of the groove bottom sipe 314 from the tread surface and the maximum groove depth Hm of the circumferential main groove 21 have a relationship of 0.20≤Hc1/Hm≤0.50.

In this configuration, the groove bottom sipe 314 reduces the ground contact pressure on the blocks in intermediate stages of wear of the tire, and this suppresses the heel and toe wear of the tire.

The groove bottom sipe 314 is a cut formed in the bottom of the groove and generally has a width of less than 1.0 mm and a depth of at least 2.0 mm so as to close when the tire comes into contact with the ground.

The width of the groove bottom sipe 314 is measured as a maximum value of an opening width thereof on the bottom of the groove with the tire mounted on a specified rim, inflated to a specified internal pressure, and in an unloaded state.

The depth of the groove bottom sipe 314 is measured as a maximum distance from the tread surface to a bottom of the sipe with the tire mounted on a specified rim, inflated to a specified internal pressure, and in an unloaded state.

Additionally, in a configuration in which the groove bottom sipe 314 includes partially uneven portions on the bottom thereof, the depth of the groove bottom sipe 314 is measured excluding these portions.

Block Row of Second Land Portion

Figure 6:
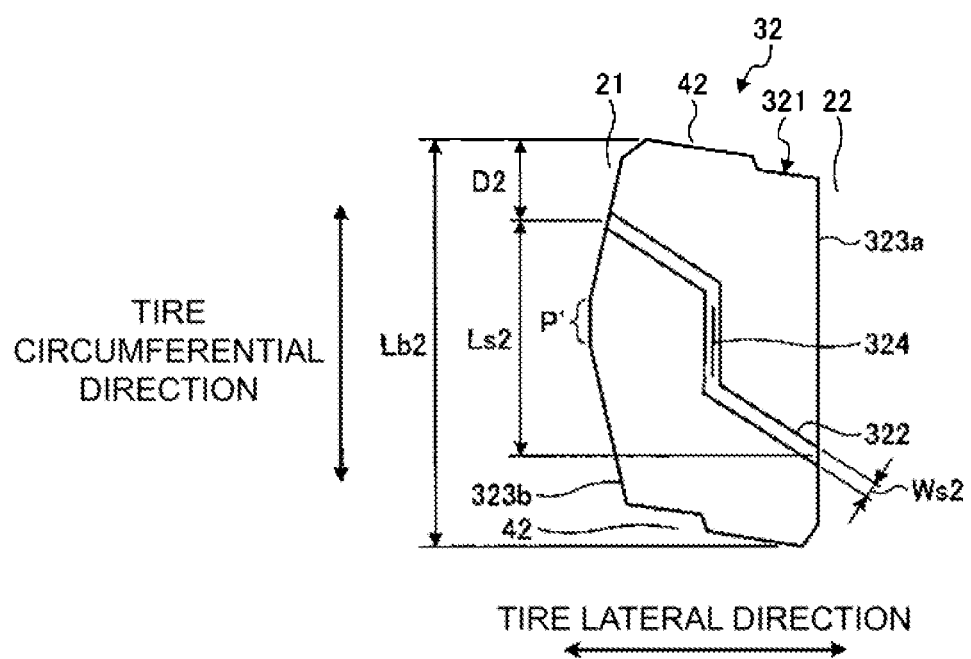
FIG. 6 is a plan view illustrating a second block illustrated in FIG. 2.

FIG. 6 is a plan view illustrating the second block illustrated in FIG. 2.

The same drawing focuses on and illustrates a single second block 321.

As illustrated in FIG. 2, the second land portion 32 includes the plurality of second lug grooves 42, and the plurality of second blocks 321.

The second lug grooves 42 extend through the second land portion 32 in the tire lateral direction and open to the left and right circumferential main grooves 21, 22 that define the second land portion 32.

Additionally, the plurality of second lug grooves 42 are disposed at predetermined intervals in the tire circumferential direction.

The second block 321 is defined by the pair of circumferential main grooves 21, 22 lying adjacent to each other in the tire lateral direction, and the pair of second lug grooves 42, 42 lying adjacent to each other in the tire circumferential direction.

Additionally, the plurality of second blocks 321 are arranged in a row in the tire circumferential direction.

As illustrated in FIG. 3, in the configuration of FIG. 2, the circumferential main groove 21 disposed to face the tire equatorial plane CL to define the second land portion 32 has a zig-zag shape that oscillates in the tire lateral direction, and the circumferential main groove 22 disposed to face the tire ground contact edge T has a straight shape.

An edge portion of the second block 321 facing the tire equatorial plane CL has a shape that projects in the tire lateral direction, and an edge portion facing the tire ground contact edge T has a flat shape.

As illustrated in FIG. 3, the second lug grooves 42 are inclined at a predetermined inclination angle θ2 with respect to the tire circumferential direction. The adjacent second lug grooves 42, 42 are inclined in the same direction.

Additionally, an interval at which the adjacent second lug grooves 42, 42 are disposed is set wider than the width W2 of the second land portion 32 (see FIG. 2). As a result, the second block 321 has a long shape in the tire circumferential direction.

As illustrated in FIG. 6, the edge portion of the second block 321 that faces the tire equatorial plane CL has a maximum projection position P' in the tire lateral direction.

Additionally, the maximum projection position P' has a predetermined circumferential length. As a result, the edge portion of the second block 321 is parallel to the tire circumferential direction in the maximum projection position P'.

Additionally, the maximum projection position P' is maldistributed in the tire circumferential direction. As a result, the edge portion of the second block 321 is divided circumferentially into a long portion and a short portion by the maximum projection position P' as a boundary.

As illustrated in FIG. 6, one second block 321 includes one narrow shallow groove 322.

The narrow shallow groove 322 has an open structure that extends through the second block 321 in the tire lateral direction and opens to the left and right circumferential main grooves 21, 22 that define the second land portion 32.

As with the narrow shallow groove 312 of the center block 311, the narrow shallow groove 322 has a narrow groove width and a shallow groove depth. As a result, the narrow shallow groove 322 remains open without closing when the tire comes into contact with the ground.

Specifically, a groove width Ws2 (see FIG. 6) of the narrow shallow groove 322 is preferably in the range of 1.0 mm≤Ws2≤4.0 mm, and more preferably in the range of 1.5 mm≤Ws2≤3.0 mm.

The groove width Ws2 of the narrow shallow groove 322 is set in association with the maximum groove depth Hm of the circumferential main groove 21 (see FIG. 5) and a maximum groove depth Hg2 of the second lug groove 42 (not illustrated) so that the narrow shallow groove 322 does not close when the tire comes into contact with the ground.

Specifically, the maximum groove depth Hm of the circumferential main groove 21 and a maximum groove depth Hs2 of the narrow shallow groove 322 (not illustrated) preferably have a relationship of 0.05≤Hs2/Hm≤0.15, and more preferably a relationship of 0.07≤Hs2/Hm≤0.12.

Similarly, the maximum groove depth Hg2 of the second lug groove 42 and the maximum groove depth Hs2 of the narrow shallow groove 322 preferably have a relationship of 0.05≤Hs2/Hg2≤0.20, and more preferably a relationship of 0.08≤Hs2/Hg2≤0.14.

Additionally, the maximum groove depth Hg2 of the second lug groove 42 preferably falls in the range of 16 mm≤Hg2.

In the configuration described above, when the tire comes into contact with the ground, the ground contact pressure on the second block 321 is dispersed via the narrow shallow groove 322, and this suppresses heel and toe wear of the blocks in initial stages of running of the tire.

Also, when the tire comes into contact with the ground, the narrow shallow groove 322 remains open without closing. As a result, the narrow shallow groove 322 exhibits an edge effect, improving the wet performance of the tire.

According to these configurations, the good heel and toe wear resistance performance and wet performance of the tire are provided in a compatible manner.

In FIG. 6, a circumferential length Ls2 of the narrow shallow groove 322 and a circumferential length Lb2 of the second block 321 preferably have a relationship of 0.45≤Ls2/Lb2≤0.65, and preferably have a relationship of 0.50≤Ls2/Lb2≤0.60.

This ensures appropriately the extension range of the narrow shallow groove 322 in the tire circumferential direction, and this ensures appropriately, in turn, the improvement in heel and toe wear resistance performance and wet performance by the narrow shallow groove 322.

The circumferential length Ls2 of the narrow shallow groove 322 of the second block 321 and the circumferential length Ls1 of the narrow shallow groove 312 of the center block 311 preferably have a relationship of 0.60≤Ls2/Ls1≤0.80, and preferably have a relationship of 0.65≤Ls2/Ls1≤0.75.

A relatively large ground contact pressure acts on the center land portion 31 when the tire comes into contact with the ground, thereby facilitating the generation of heel and toe wear on the center land portion 31.

Then, the circumferential length Ls1 of the narrow shallow groove 312 of the center block 311 is set at a large value to thereby reinforce the effect of dispersing the ground contact pressure by the narrow shallow groove 312.

As a result, the heel and toe wear of the center blocks 311 is effectively suppressed.

Additionally, in FIG. 6, a circumferential distance D2 from the circumferential end portion of the second block 321 to the end portion of the narrow shallow groove 322 and the circumferential length Lb2 of the second block 321 preferably have a relationship of 0.18≤D2/Lb2≤0.28, and preferably have a relationship of 0.19≤D2/Lb2≤0.24.

This configuration makes appropriate the position where the narrow shallow groove 322 is disposed in the block.

For example, in the configuration of FIG. 3, each of the second blocks 321 includes the single narrow shallow groove 322, and a pair of small blocks 323a, 323b defined by the narrow shallow groove 322.

The small blocks 323a, 323b include a plain tread surface with neither a sipe nor other thin grooves.

This ensures appropriately the ground contact area of the blocks.

Note that the technology is not limited thereto, and the second block 321 may have an additional sipe (not illustrated).

As illustrated in FIG. 3, the narrow shallow groove 322 has a bent shape having a plurality of bend points.

In particular, the central portion of the narrow shallow groove 322 extends parallel to the tire circumferential direction. Specifically, the central portion extends at an inclination angle of 5 degrees or less.

Additionally, the narrow shallow groove 322 is overall inclined at a predetermined angle φ2 with respect to the tire circumferential direction and is inclined in the same direction as that in which the second lug grooves 42 is inclined.

The inclination angle φ2 of the narrow shallow groove 322 is in the range of 25 degrees≤φ2≤65 degrees.

This configuration makes the inclination angle φ2 of the narrow shallow groove 322 appropriate and ensures appropriately the improvement in heal and toe wear resistance performance and wet performance by the narrow shallow grooves 322.

Note that in the configuration of FIG. 3, the inclination direction of the narrow shallow groove 312 of the center block 311 and the inclination direction of the narrow shallow groove 322 of the second block 321 are opposite to each other.

As illustrated in FIGS. 3 and 6, the edge portion of the second block 321 that faces the tire equatorial plane CL is divided into the long portion and the short portion by the maximum projection position P' in the tire lateral direction as the boundary.

Then, the narrow shallow groove 322 opens to the short portion of the edge portion of the second block 321.

Accordingly, the opening portion of the narrow shallow groove 322 is disposed offset from the maximum projection position P' of the edge portion of the second block 321.

This makes appropriate the position of the opening portions of the narrow shallow groove 322.

Additionally, the narrow shallow groove 322 has the certain groove depth Hs2 (not illustrated).

As described above, the groove depth Hs2 of the narrow shallow groove 322 is set extremely shallow relative to the groove depth Hm of the circumferential main groove 21 so that the narrow shallow groove 322 does not close when the tire comes into contact with the ground.

Note that a depth-wise structure of the narrow shallow groove 322 of the second block 321 is similar to that of the narrow shallow groove 312 of the center block 311 illustrated in FIG. 5.

As illustrated in FIGS. 3 and 6, the second block 321 includes a groove bottom sipe 324 at a central portion on a bottom of the narrow shallow groove 322.

The structure of the groove bottom sipe 324 is similar to that of the groove bottom sipe 314 of the center block 311.

Narrow Structure of Center Lug Groove

As illustrated in FIG. 3, the lug groove 41 of the center land portion 31 includes the first lug groove portion 411 and second lug groove portions 412.

The first lug groove portion 411 is disposed to intersect a center line of the center block 311.

The center line of the block is defined as a straight line passing through a midpoint of left and right maximum width positions of the block and staying parallel to the tire circumferential direction.

In the configuration of FIG. 3, the center line of the center block 311 is located on the tire equatorial plane CL.

A groove width Wg11 of the first lug groove portion 411 is in the range of 1.5 mm≤Wg11≤4.5 mm.

Additionally, the groove width Wg11 of the first lug groove portion 411 is set so that the first lug groove portion 411 closes when the center block 311 comes into contact with the ground as a result of the tire coming into contact with the ground.

Specifically, the groove width Wg11 of the first lug groove portion 411 is set appropriately in association with the maximum groove depth Hm of the circumferential main groove 21 and the groove depth Hg1 of the center lug groove 41 so that the first lug groove portion 411 closes when the block comes into contact with the ground.

An inclination angle θ1 of the first lug groove portion 411 with respect to the tire circumferential direction is in the range of 25 degrees≤θ1≤65 degrees.

A distance Dg of the first lug groove portion 411 in the tire lateral direction and a contact surface width Wb of the center block 311 have a relationship of 0.20≤Dg/Wb≤0.60 (see FIG. 3).

The contact surface width Wb of the center block 311 is measured as a maximum axial straight-line distance of a contact surface between the tire and a flat plate with the tire mounted on a specified rim, inflated to a specified internal pressure, placed on the flat plate perpendicular thereto in a static state, and loaded with a load corresponding to a specified load.

The second lug groove portions 412 open to one of the left and right circumferential main grooves 21, 21 that define the center block 311.

Thus, the second lug groove portions 412 constitute opening portions of the center lug groove 41 to the circumferential main groove 21.

A groove width Wg12 of the second lug groove portion 412 is in the range of 5.0 mm≤Wg12≤10.0 mm.

Additionally, the groove width Wg11 of the first lug groove portion 411 and the groove width Wg12 of the second lug groove portion 412 have a relationship of Wg11<Wg12.

Thus, the groove width Wg12 of the second lug groove portion 412 is greater than the groove width Wg11 of the first lug groove portion 411.

According to this configuration, the opening portion of the lug groove 41 to the circumferential main groove 21 is widened by the second lug groove portion 412.

Additionally, the groove width Wg12 of the second lug groove portion 412 is set to such a range that the second lug groove portion 412 remains open without closing when the center block 311 comes into contact with the ground as a result of the tire coming into contact with the ground.

Each of the lug grooves 41 includes the first lug groove portion 411 and the second lug groove portion 412, and these first and second lug groove portions are connected together to constitute the lug groove 41.

At a connecting portion between the first lug groove portion 411 that is narrower in width and the second lug groove portion 412 that is wider in width, the width Wg11 of the first lug groove portion 411 may be increased in a step-like fashion so that the first lug groove portion 411 is connected to the second lug groove portion 412 (see FIG. 3) or may be increased gradually so that the first lug groove portion 411 is connected to the second lug groove portion 412.

Additionally, the inclination angle (dimension reference sign omitted from the drawings) of the second lug groove portion 412 with respect to the tire circumferential direction ranges from 65 degrees to 90 degrees.

Accordingly, the inclination angle of the second lug groove portion 412 is equal to or greater than the inclination angle θ1 of the first lug groove portion 411.

Furthermore, the inclination angle of the second lug groove portion 412 is preferably greater than the inclination angle θ1 of the first lug groove portion 411.

The second lug groove portion 412 is preferably inclined in the same direction as that in which the first lug groove portion 411 is inclined.

On the other hand, a minimum groove width Wg2 of the second lug groove 42 of the second land portion 32 is set so that the second lug groove 42 remains open without closing when the block comes into contact with the ground.

Additionally, an inclination angle θ2 of the second lug groove 42 is greater than the inclination angle θ1 of the first lug groove portion 411 of the center lug groove 41 (θ1<θ2).

This enhances the drainage properties of the center region of the tread portion.

Figure 7:
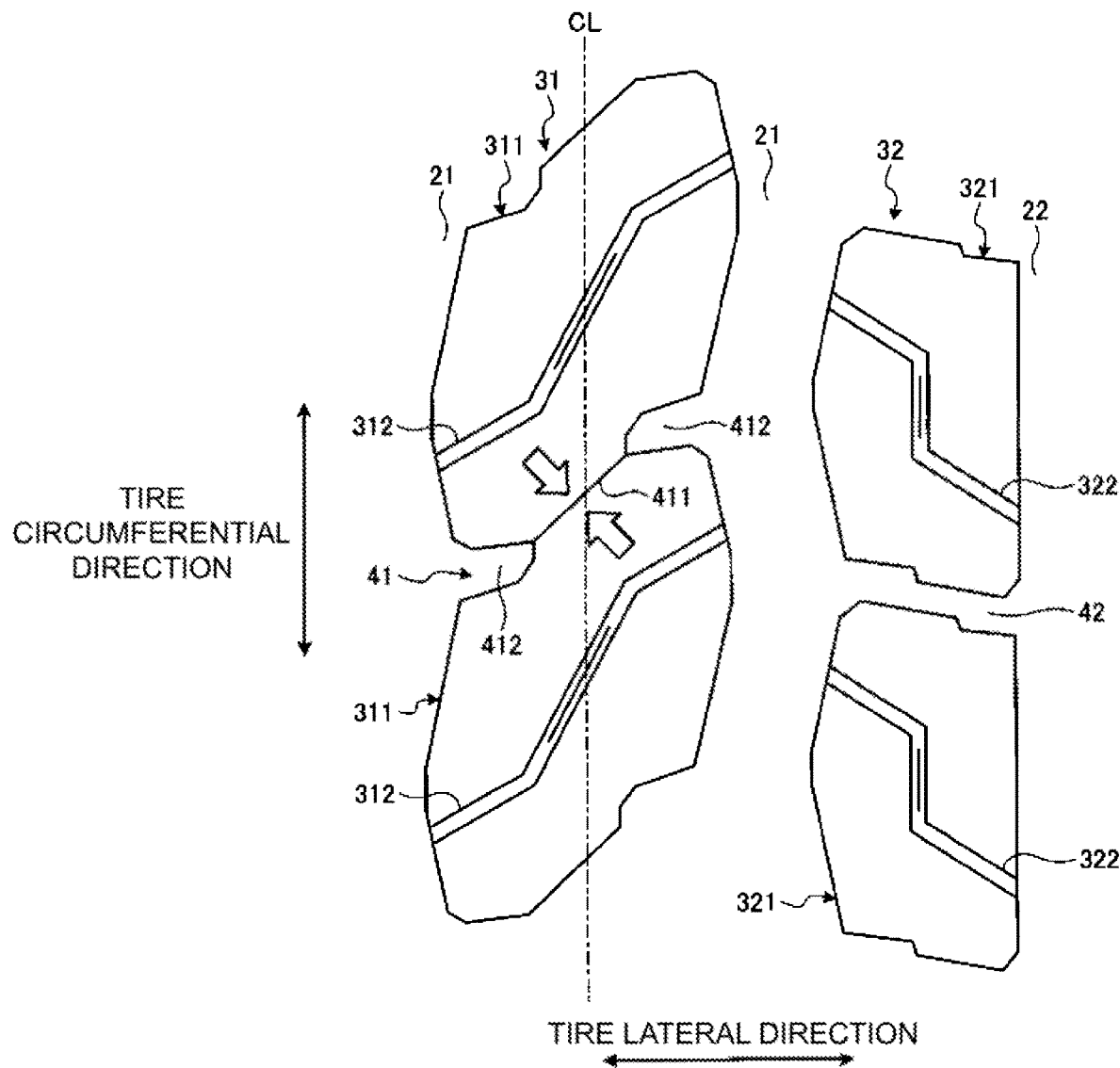
FIG. 7 is an explanatory diagram illustrating functions of the pneumatic tire illustrated in FIG. 1.

FIG. 7 is an explanatory diagram illustrating the function of the pneumatic tire illustrated in FIG. 1.

The same drawing illustrates the behaviors of the center lug grooves 41 and the second lug grooves 42 when the tire comes into contact with the ground.

As illustrated in FIG. 3, when the center blocks 311 and the second blocks 321 are not in contact with the ground, the center lug groove 41 and the second lug groove 42 are open, and the center blocks 311, 311 and the second blocks 321, 321 that lie adjacent in the tire circumferential direction are left spaced away from each other.

Next, as illustrated in FIG. 7, when the center blocks 311 and the second blocks 321 are in contact with the ground, the center block 311 and the second block 321 are compression deformed in the tire circumferential direction and the tire lateral direction by a ground contact pressure exerted thereon.

Then, the narrower first lug groove portion 411 of the center lug groove 41 closes and the center blocks 311 are brought into engagement with each other in the tire circumferential direction.

This increases the rigidity of the center land portion 31 in the tire circumferential direction to thereby suppress the heel and toe wear of the center land portion 31.

On the other hand, the second lug groove portions 412 of the center lug groove 41 remain open when the blocks come into contact with the ground due to having a wider structure than the first lug groove portion 411.

This ensures the drainage properties of the center land portion 31.

Additionally, in the second land portion 32, when the second blocks 321 come into contact with the ground, the second lug grooves 42 remain open without closing.

This ensures the drainage properties of the center region of the tread portion appropriately.

According to the configuration described above, good heel and toe wear resistance performance and wet performance of the tire are achieved in a compatible manner.

Note that in the configuration of FIG. 3, the first lug groove portion 411 and the second lug groove portion 412 of the center lug groove 41 are formed into the straight shape.

However, the technology is not limited thereto, and the first lug groove portion 411 and the second lug groove portion 412 may have, for example, an arc shape, an S-shape, a zig-zag shape, or the like (not illustrated).

Additionally, corner portions of the center block 311 where the second lug groove portion 412 and the circumferential main groove 21 intersect each other may be R chamfered or C chamfered (not illustrated).

In the configuration of FIG. 3, the center lug groove 41 includes the second lug groove portion 412 at the opening portions to the left and right circumferential main grooves 21, 21.

This configuration is preferable in that the drainage properties of the center land portion 31 are improved efficiently.

However, the technology is not limited thereof, and the center lug groove 41 may include the second lug groove portion 412 only at the opening portion to one of the circumferential main grooves 21.

Modified Example 1

Figure 8:
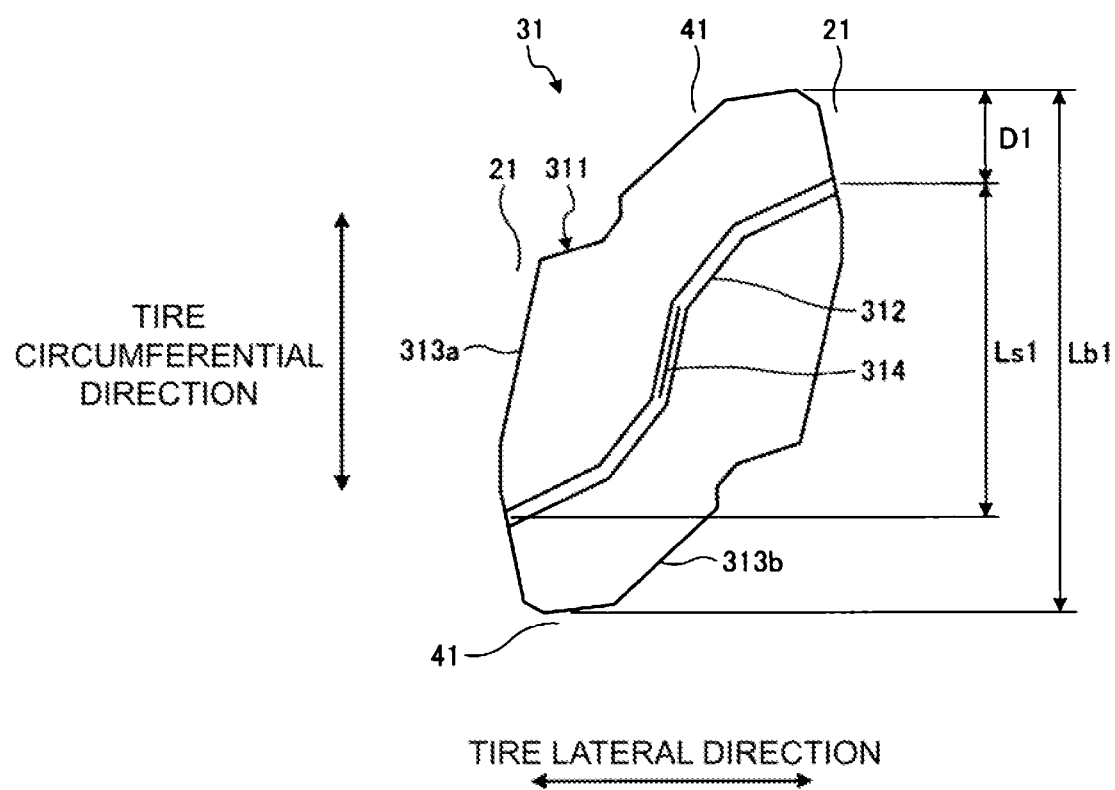
FIG. 8 is an explanatory diagram illustrating a modified example of a narrow shallow groove of the center block illustrated in FIG. 4.
Figure 9:
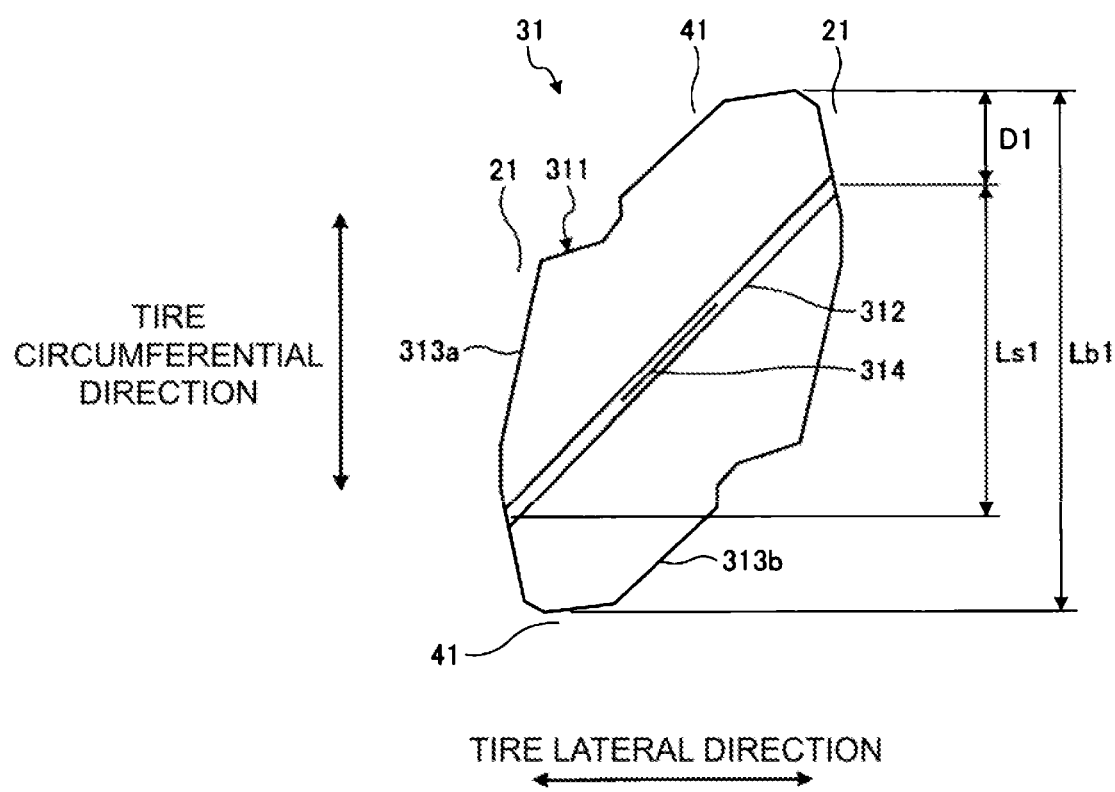
FIG. 9 is an explanatory diagram illustrating another modified example of the narrow shallow groove of the center block illustrated in FIG. 4.

FIGS. 8 and 9 are explanatory diagrams illustrating modified examples of the narrow shallow groove of the center block illustrated in FIG. 4.

Note that modified examples of the narrow shallow groove 322 of the second block 321 are similar to those of the narrow shallow groove 312 of the center block 311, and thus, the description thereof is omitted.

In the configuration of FIG. 4, the narrow shallow groove 312 has the bent shape with the two bend points.

However, the technology is not limited thereto, and the narrow shallow groove 312 may have a bent shape with at least three bend points.

For example, in the configuration of FIG. 8, the narrow shallow groove 312 has a bent shape with four bend points.

Additionally, the narrow shallow groove 312 may have a curved shape that curves in an S-shape (not illustrated).

In such a configuration, the extending length of the narrow shallow groove 312 is increased to be greater than that resulting when the narrow shallow groove 312 is configured into the straight line.

This increases the edge components of the blocks to thereby improve the wet performance of the tire.

In the narrow shallow groove 312 that is configured into the bent shape or the curved shape, it is preferable that the inclination angle of the narrow shallow groove 312 with respect to the tire circumferential direction increases gradually from the central portion of the narrow shallow groove 312 toward the edge portions of the center block 311.

Additionally, it is preferable that the inclination angle of the narrow shallow groove 312 falls within a range from 0 degrees to 35 degrees at the center line of the block and falls within a range from 50 degrees to 90 degrees at the edge portions of the block.

Note that the inclination angle of the narrow shallow groove 312 is defined as an angle formed by a tangent line of a groove center line at each position of the narrow shallow groove 312 and the tire circumferential direction.

In addition to the above configuration, the narrow shallow groove 312 may have a straight shape as illustrated in FIG. 9 or an arc shape (not illustrated).

Modified Example 2

Figure 10:
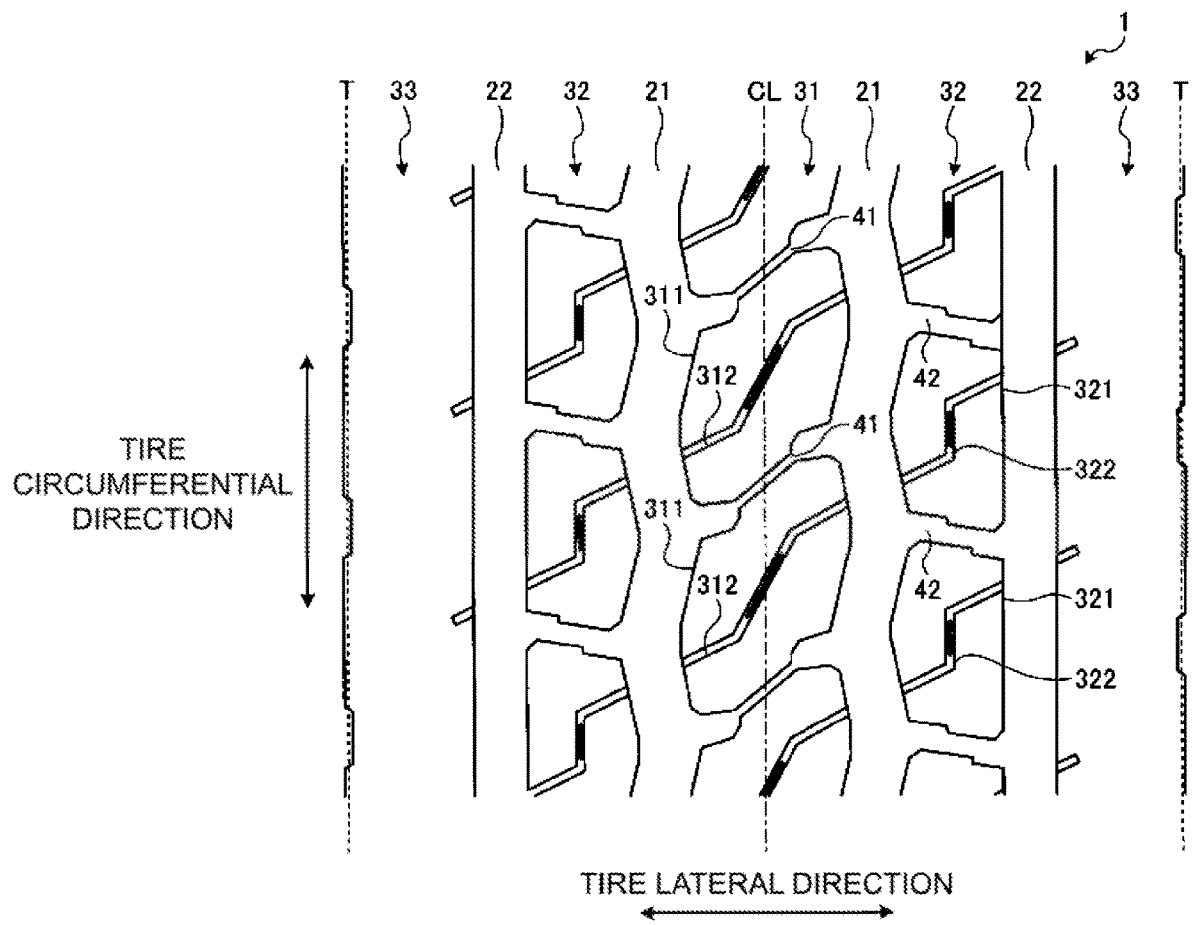
FIG. 10 is an explanatory diagram illustrating a modified example of the tread surface illustrated in FIG. 2.

FIG. 10 is an explanatory diagram of a modified example of the tread surface illustrated in FIG. 2.

In the configuration of FIG. 2, the inclination direction of the narrow shallow groove 312 of the center block 311 and the inclination direction of the narrow shallow groove 322 of the second block 321 are opposite to each other.

This configuration is preferable in that the rigidity balance can be made uniform over the entire center region of the tread portion.

However, the technology is not limited thereto, and as illustrated in FIG. 10, the inclination direction of the narrow shallow groove 312 of the center block 311 and the inclination direction of the narrow shallow groove 322 of the second block 321 may be identical to each other.

Additionally, in the configuration of FIGS. 2 and 10, the left and right shoulder land portions 33, 33 do not include a lug groove but include a rib that extends continuously in the tire circumferential direction.

However, the technology is not limited thereto, and the left and right shoulder land portions 33, 33 may include a lug groove of a semi-closed structure in which that the lug groove portion does not extend through the shoulder land portion 33 or may include a lug groove of an open structure in which the lug groove extends through the shoulder land portion 33 (not illustrated).

In the case of the later configuration, the shoulder land portion 33 is allowed to have a block row that is divided in the tire circumferential direction by the lug groove.

Effects

As has been described heretofore, the pneumatic tire 1 includes the at least four circumferential main grooves 21, 22 extending in the tire circumferential direction and the at least five land portions 31 to 33 defined by the at least four circumferential main grooves 21, 22 (see FIG. 2).

Additionally, the center land portion 31 includes the plurality of center lug grooves 41 that extend through the center land portion 31 in the tire lateral direction and are disposed at the predetermined intervals in the tire circumferential direction and the plurality of center blocks 311 that are defined by the plurality of center lug grooves 41.

Furthermore, the center block 311 includes the narrow shallow groove 312 that extends through the center block 311 in the tire lateral direction and that opens when the tire comes into contact with the ground.

In this configuration, when the tire comes into contact with the ground, the ground contact pressure on the center block 311 is dispersed via the narrow shallow groove 312, and, this suppresses heel and toe wear of the blocks in initial stages of running of the tire.

Also, when the tire comes into contact with the ground, the narrow shallow groove 312 remains open without closing, this causes the narrow shallow groove 312 to exhibit the edge effect to thereby improve the wet performance of the tire.

This configuration is advantageous in providing the tire with good heel and toe wear resistance performance and wet performance in a compatible manner.

In the pneumatic tire 1, the maximum groove depth Hm of the circumferential main groove 21 and the maximum groove depth Hs1 of the narrow shallow groove 312 have the relationship of $0.05 \leq Hs1/Hm \leq 0.15$ (see FIG. 5).

This configuration is advantageous in that the groove depth Hs1 of the narrow shallow groove 312 is made appropriate.

In other words, satisfying the relationship of $0.05 \leq Hs1/Hm$ ensures the groove depth Hs1 of the narrow shallow groove 312 to thereby ensure the appropriate dispersion of the ground contact pressure by the narrow shallow groove 312.

Additionally, satisfying the relationship of $Hs1/Hm \leq 0.15$ suppresses an excessive decrease in block rigidity attributed to an excessive depth of the narrow shallow groove 312.

In the pneumatic tire 1, the maximum groove depth Hm of the circumferential main groove 21 is in the range of 20 mm $\leq$ Hm (see FIG. 5).

With a tread pattern having the deep circumferential main grooves 21, the rigidity of the blocks is decreased to result in a tendency to facilitate the generation of heel and toe wear.

Accordingly, incorporating the configuration described above in the tread pattern described above can advantageously obtain an improvement in heel and toe wear resistance performance and wet performance of the tire effectively.

In the pneumatic tire 1, the groove width Ws1 of the narrow shallow groove 312 is in the range of $Ws1 \leq 2.0$ mm (see FIG. 4).

This configuration is advantageous in that a reduction in contact area of the blocks attributed to an excessive increase in groove width Ws1 of the narrow shallow groove 312 is suppressed.

In the configuration described above, the circumferential length Ls1 of the narrow shallow groove 312 and the circumferential length Lb1 of the center block 311 have the relationship of $0.50 \leq Ls1/Lb1 \leq 0.70$ (see FIG. 4).

This configuration is advantageous in that the extension range of the narrow shallow groove 312 in the tire circumferential direction is appropriately ensured to thereby ensure appropriately the improvement in heel and toe wear resistance performance and wet performance by the narrow shallow groove 312.

Additionally, in the pneumatic tire 1, the circumferential distance D1 from the circumferential end portion of the center block 311 to the end portion of the narrow shallow groove 312 and the circumferential length Lb1 of the center block 311 have the relationship of $0.15 \leq D1/Lb1 \leq 0.25$ (see FIG. 4).

This configuration advantageously makes appropriate the position where the narrow shallow groove 312 is disposed in the block.

In other words, satisfying the relationship of $0.15 \leq D1/Lb1$ ensures the rigidity of the blocks in the vicinity of the opening portion of the lug groove 41.

In addition, satisfying the relationship of $D1/Lb1 \leq 0.25$ ensures the extension region of the narrow shallow groove 312 to thereby ensure the function of the narrow shallow groove 312.

In the pneumatic tire 1, the center block 311 includes the single narrow shallow groove 312 and the pair of small blocks 313a, 313b defined by the narrow shallow groove 312 (see FIG. 4).

The small blocks 313a, 313b include, in turn, the plain tread surface with neither a sipe nor other thin grooves.

This configuration advantageously ensures that the blocks have the appropriate ground contact area.

Additionally, in the pneumatic tire 1, the edge portions of the center block 311 that face the circumferential main grooves 21 have the shape that projects in the tire lateral direction (see FIG. 4).

The opening portions of the narrow shallow groove 312 to the circumferential main grooves 21 are disposed offset from the maximum projection positions P of the edge portions of the center block 311.

This configuration is advantageous in that, compared to a configuration in which the narrow shallow groove 312 opens to the maximum projection positions (not illustrated) of the edge portion, the effect of dispersing the ground contact pressure exerted on the blocks is appropriately ensured, whereby the effect of improving the heel and toe wear resistance performance of the tire is effectively obtained.

In the pneumatic tire 1, the narrow shallow groove 312 has the bent shape or the curved shape, and the inclination angle of the narrow shallow groove 312 with respect to the tire circumferential direction increases from the central portion toward the edge portions of the center block 311 (see FIG. 4).

This configuration is advantageous in that the narrow shallow groove 312 is allowed to exhibit the edge effect effectively to thereby improve the wet performance of the tire.

Additionally, in the pneumatic tire 1, the second land portion 32 includes the plurality of second lug grooves 42 extending through the second land portion 32 in the tire lateral direction and disposed at the predetermined intervals in the tire circumferential direction and the plurality of second blocks 321 that are defined by the plurality of second lug grooves 42 (see FIG. 2).

Further, the second block 321 includes the narrow shallow groove 322 extending through the second block 321 in the tire lateral direction and configured to open without closing when the tire comes into contact with the ground.

This configuration is advantageous in that the heel and toe wear resistance performance and the wet performance of the tire are improved effectively as a result of the center block 311 and the second block 321 including the narrow shallow grooves 312, 322.

In the pneumatic tire 1, the circumferential length Ls2 of the narrow shallow groove 322 of the second block 321 and the circumferential length Lb2 of the second block 321 have the relationship of $0.45 \leq Ls2/Lb2 \leq 0.65$ (see FIG. 6).

This configuration is advantageous in that that the extension range of the narrow shallow groove 322 in the tire circumferential direction is appropriately ensured to thereby ensure appropriately the improvement in heel and toe wear resistance performance and wet performance by the narrow shallow groove 322.

In the pneumatic tire 1, the circumferential length Ls2 of the narrow shallow groove 322 of the second block 321 and the circumferential length Ls1 of the narrow shallow groove 312 of the center block 311 have the relationship of $0.60 \leq Ls2/Ls1 \leq 0.80$ (see FIG. 3).

A relatively large ground contact pressure acts on the center land portion 31 when the tire comes into contact with the ground, thereby facilitating the generation of heel and toe wear at the center land portion 31.

Then, by setting the circumferential length Ls1 of the narrow shallow groove 312 of the center block 311 at a large value, the dispersion of the ground contact pressure by the narrow shallow groove 312 is enhanced further.

This configuration is advantageous in that the heel and toe wear of the center blocks 311 is effectively suppressed.

In the pneumatic tire 1, the center lug groove 41 includes the first lug groove portion 411 and the at least one second lug groove portion 412 that opens to one of the circumferential main grooves 21 (see FIG. 3).

Additionally, the groove width Wg11 of the first lug groove portion 411 and the groove width Wg12 of the second lug groove portion 412 satisfy the conditions of 1.5 mm≤Wg11≤4.5 mm and Wg11≤Wg12.

Additionally, when the block comes into contact with the ground, the first lug groove portion 411 closes and the second lug groove portion 412 remains open without closing (see FIG. 7).

In this configuration, the narrower first lug groove portion 411 of the center lug groove 41 closes and the center blocks 311, 311 are brought into engagement with each other in the tire circumferential direction when the tire comes into contact with the ground.

This configuration is advantageous in that the rigidity of the center land portion 31 in the tire circumferential direction is increased to thereby suppress the heel and toe wear of the center land portion 31.

Additionally, in the pneumatic tire 1, the second land portion 32 includes the plurality of second lug grooves 42 extending through the second land portion 32 in the tire lateral direction and disposed at the predetermined intervals in the tire circumferential direction, and the plurality of second blocks 321 that are defined by the plurality of second lug grooves 42 (see FIG. 3).

Additionally, when the blocks come into contact with the ground, the second lug grooves 42 remain open without closing (see FIG. 7).

This configuration is advantageous in that keeping the second lug grooves 42 open without closing when the blocks come into contact with the ground ensures the drainage properties of the center region of the tread portion appropriately.

In the pneumatic tire 1, the center block 311 includes the groove bottom sipe 314 formed in the bottom of the narrow shallow groove 312 (see FIGS. 3 to 5).

This configuration is advantageous in that the groove bottom sipe 314 reduces the ground contact pressure on the blocks in the intermediate stages of wear of the tire to thereby suppress the heel and toe wear of the tire.

Examples

FIGS. 11A-11B include a table showing the results of performance tests carried out on the pneumatic tires according to the embodiments of the technology.

In the performance tests, a plurality of different types of test tires were evaluated for (1) heel and toe wear resistance performance and (2) wet performance.

The test tires were of a tire size of 295/75R22.5 and were mounted on JATMA specified rims, inflated to the JATMA specified internal pressure, and loaded with the JATMA specified load.

The test tires were mounted on a 2-DD tractor head test vehicle.

(1) In evaluation of the test tires for heel and toe wear resistance performance, the test vehicle was driven 50000 km, then the test tires were measured for amounts of heel and toe wear of the blocks of the center region of the tread portion.

Then, the measurement results were expressed in index value for evaluation based on a reference index value (100) given to conventional test examples.

In this evaluation for heel and toe wear resistance performance based on index values, larger index values are preferable.

(2) In evaluation of the test tires for wet performance, the test vehicle was driven on an asphalt road covered with water of 1 mm depth, and accelerations from 5 km/h to 20 km/h were measured.

Then, the measurement results were expressed in index value for evaluation based on a reference index value (100) given to the conventional test examples.

In this evaluation for accelerations based on index values, larger index values are preferable.

The test tires of Examples 1 to 15 had the structure illustrated in FIGS. 1 and 2.

Additionally, the groove width of the circumferential main grooves 21, 22 was 14 mm, and the groove depth Hm was 25 mm.

The groove depth Hg1 of the center lug grooves 41 and the groove depth Hg2 of the second lug grooves 42 were 21 mm.

The circumferential length Lb1 of the center block 311 was 70 mm, and the width Wb (=W1) was 45 mm.

The circumferential length Lb2 of the second block 321 was 54 mm, and the width (=W2) was 30 mm.

The conventional test tires were different from the test tires of the embodiments of the technology in that in the configuration of FIGS. 1 to 3, the center block 311 and the second block 321 of the center region of the tread portion did not include a thin groove or a sipe but had a plain tread surface.

It is seen from the test results that the pneumatic tires 1 of Examples 1 to 15 provide good heel and toe wear resistance performance and wet performance in a compatible manner.

Specifically, the pneumatic tires 1 of Examples 1 to 15 provide a high degree of heel and toe wear resistance performance and wet performance in a compatible manner (evaluated 108 or greater).

In comparison, Comparative Example 1 provides a slightly lower improvement in heel and toe wear resistance than that of Examples 1 to 15, and Comparative Example 2 provides a slightly lower improvement in wet performance than that of Examples 1 to 15.

The invention claimed is:

1. A pneumatic tire, comprising:
    four circumferential main grooves extending in a tire circumferential direction; and
    five land portions defined by the circumferential main grooves;
    a land portion located on a tire equatorial plane being defined as a center land portion;
    the center land portion comprising a plurality of center lug grooves disposed at predetermined intervals in the tire circumferential direction and extending through the center land portion in a tire lateral direction, and a plurality of center blocks defined by the plurality of center lug grooves;
    the plurality of center blocks each comprising a narrow shallow groove extending through the center block in the tire lateral direction and configured to remain open when the tire comes into contact with a ground, wherein a groove width Ws1 of the narrow shallow groove is in a range of 1.0 mm≤Ws1≤4.0 mm;
    a maximum groove depth Hm of the circumferential main grooves and a maximum groove depth Hs1 of the narrow shallow groove having a relationship of 0.07≤Hs1/Hm≤0.15; and the maximum groove depth Hm of the circumferential main grooves being in a range of 20 mm≤Hm; wherein
letting the land portion located outwardly adjacent to the center land portion in the tire lateral direction be defined as a second land portion, the second land portion comprises:
a plurality of second lug grooves extending through the second land portion in the tire lateral direction and disposed at predetermined intervals in the tire circumferential direction, and
a plurality of second blocks defined by the plurality of second lug grooves;
the plurality of second blocks each comprising a narrow shallow groove extending through the second block in the tire lateral direction and configured to remain open without closing when the tire comes into contact with the ground; and
a width W1 of the center land portion and a width W2 of the second land portion have a relationship of 1.3≤W1/W2≤1.7, and the circumferential main groove disposed to face the tire equatorial plane to define the second land portion has a zig-zag shape that oscillates in the tire lateral direction, and the circumferential main groove disposed to face the tire ground contact edge has a straight shape.

2. The pneumatic tire according to claim 1, wherein a circumferential length Ls1 of the narrow shallow groove and a circumferential length Lb1 of the center block have a relationship of 0.50≤Ls1/Lb1≤0.70.

3. The pneumatic tire according to claim 1, wherein a circumferential distance D1 from a circumferential end portion of the center block to an end portion of the narrow shallow groove and a circumferential length Lb1 of the center block have a relationship of 0.15≤D1/Lb1≤0.25.

4. The pneumatic tire according to claim 1, wherein
the center block comprises the narrow shallow groove, and a pair of small blocks defined by the narrow shallow groove; and
the small blocks have a plain tread surface with neither a sipe nor other thin grooves.

5. The pneumatic tire according to claim 1, wherein
an edge portion of the center block that faces the circumferential main groove has a shape projecting in the tire lateral direction; and
an opening portion of the narrow shallow groove to the circumferential main groove is disposed offset from a maximum projection position of the edge portion of the center block.

6. The pneumatic tire according to claim 1, wherein
the narrow shallow groove has a bent shape or a curved shape; and
an inclination angle of the narrow shallow groove with respect to the tire circumferential direction increases from a central portion toward an edge portion of the center block.

7. The pneumatic tire according to claim 1, wherein a circumferential length Ls2 of the narrow shallow groove of the second block and a circumferential length Lb2 of the second block have a relationship of 0.45≤Ls2/Lb2≤0.65.

8. The pneumatic tire according to claim 1, wherein a circumferential length Ls2 of the narrow shallow groove of the second block and a circumferential length Ls1 of the narrow shallow groove of the center block have a relationship of 0.60≤Ls2/Ls1≤0.80.

9. The pneumatic tire according to claim 1, wherein
the plurality of center lug grooves each comprise a first lug groove portion, and at least one second lug groove portion that opens to one of the circumferential main grooves;
a groove width Wg11 of the first lug groove portion and a groove width Wg12 of the second lug groove portion satisfy conditions of 1.5 mm≤Wg11≤4.5 mm and Wg11<Wg12; and
when the blocks come into contact with the ground, the first lug groove portion closes and the second lug groove portion remains open without closing.

10. The pneumatic tire according to claim 9, wherein
when the blocks come into contact with the ground, the plurality of second lug grooves remain open without closing.

11. The pneumatic tire according to claim 1, wherein the center block comprises a groove bottom sipe formed in a bottom of the narrow shallow groove.

12. The pneumatic tire according to claim 1, wherein the width W1 of the center land portion and the width W2 of the second land portion have a relationship of 1.3≤W1/W2≤1.6.

13. The pneumatic tire according to claim 1, wherein a pair of shoulder land portions of the land portions are ribs that are continuous in the tire circumferential direction.

14. The pneumatic tire according to claim 1, wherein the width W1 of the center land portion and a tread width TW have a relationship of 0.15≤W1/TW ≤0.25.

15. The pneumatic tire according to claim 1, wherein an inclination direction of the narrow shallow groove of the center block and an inclination direction of the narrow shallow groove of the second block are opposite to each other.

16. A pneumatic tire, comprising:
four or more circumferential main grooves extending in a tire circumferential direction; and
five or more land portions defined by the circumferential main grooves;
a land portion located on a tire equatorial plane or a land portion defined by the circumferential main groove located on the tire equatorial plane being defined as a center land portion;
the center land portion comprising a plurality of center lug grooves disposed at predetermined intervals in the tire circumferential direction and extending through the center land portion in a tire lateral direction, and a plurality of center blocks defined by the plurality of center lug grooves;
the plurality of center blocks each comprising a narrow shallow groove extending through the center block in the tire lateral direction and configured to remain open when the tire comes into contact with a ground, wherein a circumferential length Ls1 of the narrow shallow groove and a circumferential length Lb1 of the center block have a relationship of 0.50≤Ls1/Lb1≤0.70; and
an inclination angle φ1 of the narrow shallow groove with respect to the tire circumferential direction being in a range of 30 degrees≤φ1≤60 degrees; wherein
the circumferential length Ls1 of the narrow shallow groove is measured using opening positions of the narrow shallow groove at edge portions of the center block as measuring points, and
the inclination angle φ1 of a whole of the narrow shallow groove is measured as an angle formed by an imaginary line joining left and right opening portions of the narrow shallow groove at edge portions of the center block and the tire circumferential direction.

17. The pneumatic tire according to claim 16, wherein:
the plurality of center lug grooves each comprise a first lug groove portion and at least one second lug groove portion that opens to one of the circumferential main grooves;
a groove width Wg11 of the first lug groove portion and a groove width Wg12 of the second lug groove portion satisfy conditions of 1.5 mm≤Wg11≤4.5 mm and Wg11<Wg12; and
when the blocks come into contact with the ground, the first lug groove portion closes and the second lug groove portion remains open without closing.

18. A pneumatic tire, comprising:
four or more circumferential main grooves extending in a tire circumferential direction; and
five or more land portions defined by the circumferential main grooves;
a land portion located on a tire equatorial plane or a land portion defined by the circumferential main groove located on the tire equatorial plane being defined as a center land portion;
a land portion located outwardly adjacent to the center land portion in the tire lateral direction being defined as a second land portion;
the center land portion comprising a plurality of center lug grooves disposed at predetermined intervals in the tire circumferential direction and extending through the center land portion in a tire lateral direction, and a plurality of center blocks defined by the plurality of center lug grooves;
the plurality of center blocks each comprising a narrow shallow groove extending through the center block in the tire lateral direction and configured to remain open when the tire comes into contact with a ground;
the second land portion comprising a plurality of second lug grooves extending through the second land portion in the tire lateral direction and disposed at predetermined intervals in the tire circumferential direction, and a plurality of second blocks defined by the plurality of second lug grooves;
the plurality of second blocks each comprising a narrow shallow groove extending through the second block in the tire lateral direction and configured to remain open without closing when the tire comes into contact with the ground; and
a circumferential length Ls2 of the narrow shallow groove of the second block and a circumferential length Ls1 of the narrow shallow groove of the center block having a relationship of 0.60≤Ls2/Ls1≤0.80.

* * * * *